UNITED STATES PATENT OFFICE 2,614,084

ALKYL THIOPHENE SULFONATE WETTING AGENTS AND METHOD FOR MAKING SAME

Philip D. Caesar and Pharez G. Waldo, Wenonah, N. J., and Duncan J. Crowley, Oak Ridge, Tenn., assignors to Socony-Vacuum Oil Company, Incorporated, a corporation of New York No Drawing. Application March 10, 1947, Serial No. 733,725

6 Claims. (Cl. 252—352)

The present invention relates to the sulfonation of alkylthiophenes and, more particularly, to the sulfonation of alkylthiophenes and the wetting action of the reaction products.

Steinkopf has pointed out that the sulfonation of thiophene was the first means of separating or isolating thiophene from coal tar and was based on the fact that thiophene is more reactive than benzene. That is to say, thiophene can be sulfonated with sulfuric acid or chlorosulfonic acid in the presence of large excesses of such neutral solvents as benzene or petroleum ether or by the use of extremely short reaction times. The methods for sulfonating halogenated thiophenes are also known. On the other hand, Steinkopf, "Chemie des Thiophenes," 98 (1941) ("Verlag Theodor Steinkopff, Dresden and Leipzig") suggests that it is difficult to sulfonate alkylthiophenes. Krekeler et al. prepared methyl- and ethylthiophene sulfonic acid from methyl- and ethylacetothienone using oleum [Ber. 19, 651, 676, 1620, 2627 (1886)]. Keiser was able to isolate dimethylthiophene sulfonic acids from xylene-rich mixtures by bromonation of the mixture, selective sulfonation of the bromothioxenes, and debromination of the bromo-thiophene sulfonic acids. Steinkopf (ibid. 98, 99) states that 2,5-dihalogenthiophene, or in general all derivatives which have substitutents of the first order in the 2,5 positions, therefore 5-bromo-2-methylthiophene or 2,5-thioxen, when treated with fuming sulfuric acid yield intramolecular disulfonic acid anhydrides of the general structure

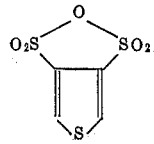

compounds which are insoluble in water and also fairly stable at temperatures near that of boiling point but which are split by hot alkali into alkali metal salts of the corresponding disulfonic acids. Thus it would appear that alkylthiophene sulfonic acids can only be prepared by indirect methods. However, it has now been discovered that novel wetting agents can be prepared by direct sulfonation of the alkylthiophenes with concentrated sulfuric acid or oleum.

It is an object of the present invention to provide a method for directly sulfonating alkylthiophenes. It is another object of the present invention to provide a method for directly sulfonating alkylthiophenes using concentrated sulfuric acid or oleum. It is a further object of the present invention to provide a method for sulfonating alkylthiophenes having up to 26 carbon atoms in the alkyl group. The present invention also has as an object the provision of novel wetting agents.

In general, the method of the present invention involves sulfonating alkylthiophenes in which the alkyl groups have about 4 to about 26 carbon atoms, and preferably 5 to about 12 carbon atoms with oleum in liquid sulfur dioxide as a sulfonating medium or with concentrated sulfuric acid. The temperature of the latter reaction is maintained below about 60 to about 70 degrees centigrade and preferably between about 20 and about 50 degrees centigrade. The temperature of the former reaction is about minus 5 degrees centigrade. The alkylthiophenes are sulfonated with about 1 to about 3 parts by weight of 100 per cent sulfuric acid either in the form of concentrated sulfuric acid or in the form of oleum, such as 60 per cent oleum. After 10 to 30 minutes at reaction temperatures the sulfonation mixture is "quenched" in the usual manner, the quenched mixture neutralized and the salts of the sulfonic acids recovered in any suitable manner.

Illustrative, but not limiting, of the sulfonation of alkylthiophenes having one to three alkyl groups having up to 26 carbon atoms are the following examples.

EXAMPLE I

To 5 parts by weight of diamylthiophene was added with stirring 10 parts by weight of 102 per cent $H_2SO_4$. The solution was stirred for 10 to 15 minutes at 20 to 30 degrees centigrade. It was then diluted with 5 to 6 parts by weight of ice water and allowed to separate into clear layers. The bottom acid layer was withdrawn and the purple top layer was further diluted with water. A stable white emulsion formed which held for several days both in the acid and basic media.

EXAMPLE II

Fifty parts by weight of 101 per cent $H_2SO_4$ were added to 20 parts by weight of t-amylthiophene. The reaction mixture was stirred for 30 minutes keeping the temperature below about 50 degrees centigrade. Twenty parts by weight of acid were added with no apparent rise in temperature. The solution was diluted with 80 parts by weight of water. The sulfonic acid layer was separated from the other layers, neutralized with NaOH, washed with petroleum ether, and extracted with petrohol. The petrohol extract was salted out with sodium chloride and most of the alcohol evaporated off. The sulfonate was dried and about 20 to 25 parts by weight of a straw-colored sulfonate was recovered.

The product obtained by the direction sulfonation of tertiary amylthiophene is illustrative of certain peculiarities inherent in the novel products. The total sulfonation product in the form of an alkali metal salt is a more effective wetting agent than the corresponding alkali metal salt of t-amylbenzene. That is to say, the sodium salt of the sulfonation product of t-amylthiophene at 0.5 per cent concentration has a wetting time in the "Draves" test of 29 seconds while at the same concentration the sodium salt of t-amylbenzene sulfonic acid is more than 300 seconds. The neutralized total sulfonation product of t-amylthiophene can be fractionally crystallized into two principal products one of which has practically no wetting power at 0.5 per cent concentration and the other of which is quite effective as a wetting agent in the same concentration.

The total neutralized sulfonation product derived by sulfonating tertiary amylthiophene was a pale yellow hygroscopic solid which gave a wetting time of about 29 seconds at 0.5 per cent weight concentration in the Draves test. This total sulfonation product was carefully resolved into a fine white powder which had no wetting effect and a darker hygroscopic solid which at 0.5 weight concentration had a wetting time in the Draves test of about 100 seconds.

EXAMPLE III

Thirteen parts by weight of alkylthiophenes (prepared by condensing thiophene with thermal gasoline boiling 108–135 degrees centigrade) boiling from 110 to 145 degrees centigrade at 1 millimeter was mixed with 70 parts by weight of liquid sulfur dioxide. To this mixture was added slowly a solution of 12 parts by weight of 60 per cent oleum dissolved in 28 parts by weight of liquid sulfur dioxide. The mixture was quenched into 10 parts by weight of ice. The quenched mixture was warmed to 30 degrees centigrade, 9 parts by weight of petrohol, and 10 parts by weight of water were added. This mixture was neutralized with 24 parts by weight of 49.9 degrees Baumé sodium hydroxide solution. Six petroleum ether extractions of 20 parts by weight were made on the sulfonate solution. This solution was then dried on the drum dryer. The crude dry product containing inorganic salts was mixed with 320 parts by weight of absolute methanol and heated to boiling with stirring, then filtered. The filtrate was substantially free of inorganic salts. It was concentrated to facilitate drying, and subsequently dried on the laboratory drum dryer. Ten parts by weight of a purified product was obtained.

The sulfonation products derived by sulfonating alkylthiophenes having 4 to 25 carbon atoms in the alkyl group or groups are novel wetting agents and detergents. The potassium and sodium salts of the sulfonation products derived by sulfonating monoalkylthiophene having 4 to 6 carbon atoms in the alkyl group and the neutralized sulfonation products derived by sulfonating dialkylthiophenes having 6 to about 10 carbon atoms in each alkyl group are preferred. In other words, the novel wetting agents are the neutralized sulfonation products derived by sulfonating alkylthiophenes having 4 to 25 total alkyl carbon atoms and having a wetting time in the Draves test in 0.5 per cent by weight concentration of not more than about 100 seconds.

The sulfonation products derived from alkylthiophenes of the class described hereinbefore are also useful detergents as well as wetting agents. For example, a solution of the sodium salt of the sulfonation product derived from di-tertiary-amylthiophene removed 5.3 per cent of the soil in a standard detergency test, whereas a solution of similar concentration by weight of a commercial wetting agent under the same conditions removed 9.3 per cent of the soil.

A tabulation of the wetting powers of the sodium salts of the total sulfonation products derived from various alkylthiophenes is provided hereinafter.

*Wetting effects of alkylthiophene sulfonation products*

| Run | Parent Alkylthiophene | Source of Alkyl Group | Draves Wetting Test Alkylthiophene Sulfonation Products (Time in sec. in conc. of)— | | | |
|---|---|---|---|---|---|---|
| | | | 1% | ½% | ¼% | ⅛% |
| 1 | t-butyl- | isobutene | | 75 | 300+ | |
| 2 | t-amyl- | isoamylene | | 29 | 300+ | |
| 3 | octyl | therm. gasoline (108–135° C.) | | 37 | 214 | 300+ |
| 4 | dihexyl- | chlorinated n-hexane | | inst. | 21 | 202 |
| 5 | dioctyl- | therm. gasoline (108–135° C.) | | inst. | 2 | 35 |
| 6 | dodecyl- | 1-bromododecane | | 141 | 300+ | |

Although the present invention has been described in terms of the alkali metal salt of the total sulfonation product derived by sulfonating various parent mono- and dialkylthiophenes and mixtures of alkylthiophenes, it is to be understood that the sulfonation mixture may be neutralized with other bases such as ammonia to provide neutralized sulfonation products soluble in water at least to the extent of about 2 to about 5 per cent.

We claim:

1. A method for preparing a wetting agent which comprises reacting 1 part by weight of an alkylthiophene having a total of about 4 to about 25 alkyl carbon atoms in addition to the carbon atoms of the thiophene nucleus and at least one nuclear hydrogen atom and about 1 to about 3 parts by weight of a sulfonating agent selected from the group consisting of concentrated sulfuric acid and oleum at a temperature below 70° C., quenching the reaction mixture in about 0.4 to about 1.2 parts by weight of water and neutralizing the quenched reaction mixture with a base selected from the group consisting of alkali metal hydroxides and ammonia.

2. A method for preparing a wetting agent which comprises reacting 1 part by weight of an alkylthiophene having a total of about 4 to about 25 alkyl carbon atoms in addition to the carbon atoms of the thiophene nucleus and at least one nuclear hydrogen atom with about 1 to about 3 parts by weight of a sulfonating agent selected from the group consisting of concentrated sulfuric acid and oleum at a temperature of about 20 to about 30° C., quenching the reaction mixture in about 0.4 to about 1.2 parts by weight of water and neutralizing the quenched reaction mixture with a base selected from the group consisting of alkali metal hydroxides and ammonia.

3. A method for preparing a wetting agent which comprises reacting in the presence of liquid sulfur dioxide 1 part by weight of an alkylthiophene having a total of about 4 to about 25 alkyl carbon atoms in addition to the carbon atoms of the thiophene nucleus and at least one nuclear hydrogen atom and about 1 to about 3 parts by weight of a sulfonating agent selected from the group consisting of concentrated sulfuric acid and oleum at a temperature of about minus 5° C., evaporating the sulfur dioxide, quenching the residue, and neutralizing the quenched residue with a base selected from the group consisting of alkali metal hydroxides and ammonia.

4. A method for preparing a wetting agent which comprises reacting 1 part by weight of an alkylthiophene selected from the group consisting of tertiary-amylthiophene and diamylthiophene with about 1 to about 3 parts by weight of a sulfonating agent selected from the group consisting of concentrated sulfuric acid and oleum at a temperature not greater than 70° C., quenching the reaction mixture, and neutralizing the reaction mixture with a base selected from the group consisting of alkali metal hydroxides and ammonia.

5. A wetting agent consisting essentially of the alkali metal salt of the total quenched reaction product of the reaction of about 1 part by weight of tetiary-amylthiophene and about 2.5 parts by weight of concentrated sulfuric acid at a temperature below 50° C., said neutralized total reaction product in 0.5 weight per cent concentration of the dry solids of said neutralized total reaction product having a wetting time in the "Draves" test of about 29 seconds.

6. A wetting agent consisting essentially of the sodium salt of the total reaction product of the quenched reaction of about 1 part by weight of tertiary amylthiophene and about 2.5 parts by weight of concentrated sulfuric acid at temperatures below 50° C., said neutralized total reaction product in 0.5 weight per cent concentration of the dry solids of said neutralized total reaction product as the sodium salt having a wetting time in the "Draves" test of about 29 seconds.

PHILIP D. CAESAR.
PHAREZ G. WALDO.
DUNCAN J. CROWLEY.

REFERENCES CITED

The following references are of record in the file of this patent:

UNITED STATES PATENTS

| Number | Name | Date |
|---|---|---|
| 2,283,199 | Flett | May 19, 1942 |
| 2,393,526 | Flett | Jan. 22, 1946 |
| 2,480,465 | Halbedel | Aug. 30, 1949 |
| 2,482,084 | Caesar and Waldo | Sept. 20, 1949 |

OTHER REFERENCES

Muhlert Berichte 19 (1886), pp. 1621–1623.
Wood: Ind. Eng. Chem. 18, p. 170 (1926).
Richter: Organic Chemistry, pp. 649, 659, John Wiley (1938).
Alles: J. Pharm. and Exp. Ther. 72, p. 265 (1941).
Caesar et al.: Ind. & Eng. Chem., May 1948, p. 922.